July 14, 1959  J. H. BOSTOCK  2,894,715
VALVE
Filed Sept. 5, 1956  2 Sheets-Sheet 1
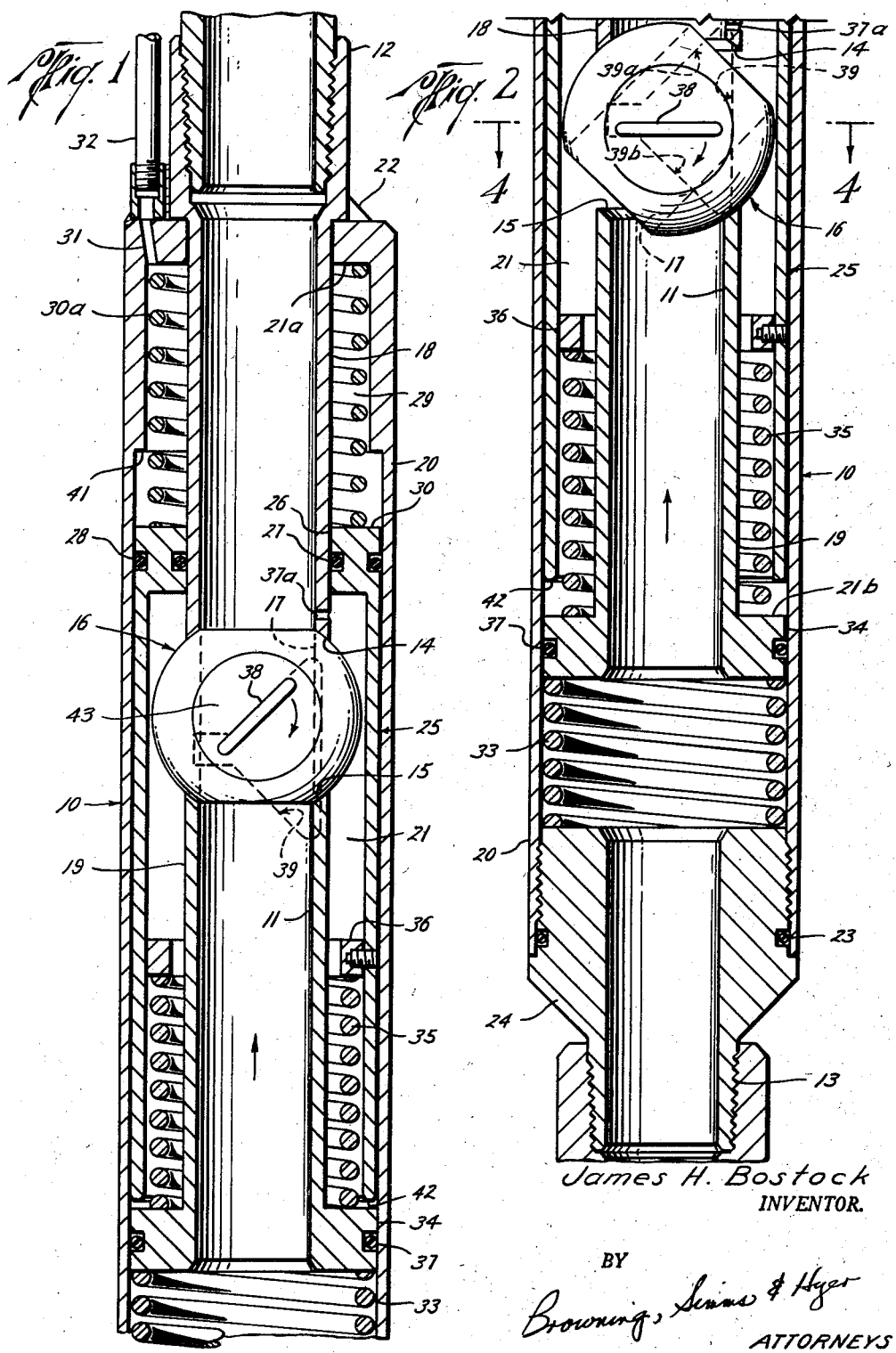
James H. Bostock
INVENTOR.
BY
Browning, Simms & Hyer
ATTORNEYS July 14, 1959  J. H. BOSTOCK  2,894,715
VALVE
Filed Sept. 5, 1956 2 Sheets-Sheet 2
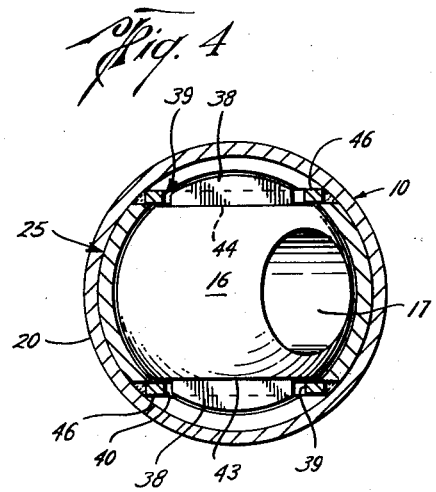
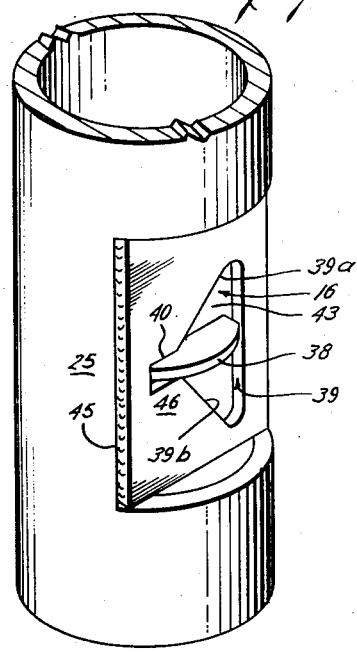
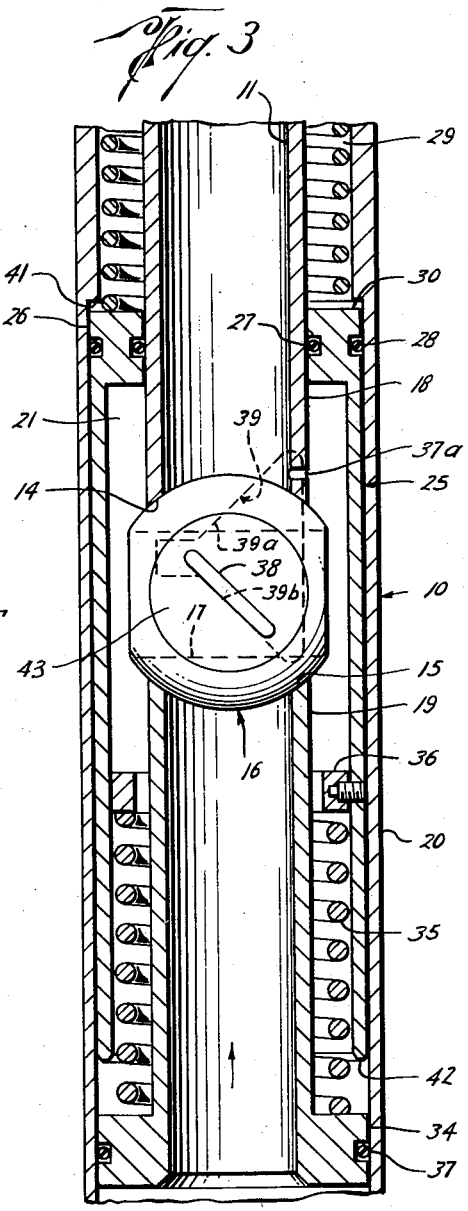
James H. Bostock
INVENTOR.
BY
ATTORNEYS

United States Patent Office 2,894,715
Patented July 14, 1959

2,894,715
VALVE

James H. Bostock, Dallas, Tex., assignor to Otis Engineering Corporation, Dallas, Tex., a corporation of Texas Application September 5, 1956, Serial No. 608,081

18 Claims. (Cl. 251—58)

This invention relates to valves of the type having a valve member rotatable between opened and closed positions by means of a control pressure. In one of its aspects, this invention relates to an improved valve of this type especially well suited for use at a subsurface level within a well.

For various reasons well known in the art, it may be desirable to install a valve within the tubing of an oil or gas well for the purpose of shutting off the production therefrom at a subsurface level. For this purpose, a line may be extended downwardly into the well for supplying a control fluid from a source at ground level to the valve for moving the valve member between opened and closed positions.

For such subsurface use, the valve should be straight through and full-opening so as to accommodate various tools which may be passed through the tubing. Furthermore, with space within a well at a premium, the valve should be of minimum cross-section. Still further, a subsurface valve must be positive of action, particularly in closing, under a wide range of pressure conditions within the well.

Prior valves which have been designed with the foregoing in mind have either employed a sleeve-type valve member requiring a fishing job to provide a full opening therethrough, or have failed to provide protection for the actuating parts of the valve member from solids, such as sand or gritty substances frequently found in oil production.

An object of this invention is to provide a fluid actuated valve for subsurface or other use which is slender of construction and movable between closed and fully opened positions by an actuator which is protected from solids within the well fluid.

Another object is to provide a valve having a rotatable, and preferably ball-type, valve member which is rotated between closed and fully opened positions by means of a fluid controlled actuator longitudinally reciprocable within the valve body in a path concentrically outwardly of the passageway therethrough.

Still another object is to provide an improved valve having a valve member which is rotatable between closed and fully opened positions by means of a fluid controlled actuator enclosed within a space of the valve body which is sealed against the admission of solids in the fluid flowing through the valve.

A further object is to provide an improved valve in which the valve member is rotated between closed and fully opened positions by means of a fluid controlled actuator longitudinally reciprocable within a space arranged annularly of the passageway through the valve body and sealed off against the admission of solids within the fluid flowing through the valve.

A still further object is to provide a valve of the general character above-described in which seats for the valve member are formed on tubular parts which define and seal off the annular space, without offering undue frictional resistance to rotation of the valve member.

Yet a further object is to provide a valve having a rotatable valve member and a longitudinally reciprocable actuator therefor which are so arranged and connected to one another as to necessitate only slightly greater space within the valve body than is otherwise required by the valve member itself.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a longitudinal sectional view of substantially the entire length of an illustrative embodiment of a valve constructed in accordance with the present invention, and with the valve member thereof disposed in a fully opened position;

Fig. 2 is a longitudinal sectional view of the lower portion of the valve of Fig. 1, with the valve member therein in a position intermediate opened and closed positions;

Fig. 3 is a longitudinal sectional view of the middle portion of the valve of Fig. 1, with the valve member thereof in the closed position;

Fig. 4 is a cross-sectional view of the valve, taken substantially along broken line 4—4 of Fig. 2; and Fig. 5 is a perspective view of part of the actuator for the valve member removed from the valve body and operatively connected to the valve member.

Referring now in detail to the above-described drawings, the valve of the present invention comprises a valve body 10 having a passageway 11 therethrough and connectable in a flow line at its opposite ends 12 and 13. According to one aspect of the present invention, the flow line may comprise a production tubing within a well with the valve disposed at a subsurface level therein. Alternatively, the flow line may be a pipe line at ground level. In any case, however, it is contemplated that the diameter of the passageway 11 corresponds at least approximately to the minimum diameter of the flow line so that the valve will be full opening, in a manner to be described hereinafter.

Disposed along an intermediate portion of the valve body 10 in surrounding relation to the passageway 11 are a pair of spaced apart and oppositely facing spherical seats 14 and 15. A ball type valve member 16 having an opening 17 therethrough is seatable between the seats 14 and 15 for rotation about an axis transverse to the axis of said opening between opened (Fig. 1) and closed (Fig. 3) positions. As best shown in Fig. 1, the diameter of opening 17 corresponds to that of the passageway 11 so that the valve is full opening.

The ball shape of the valve is preferred due to its greater adaptability to seating as well as the fact that it takes up a minimum of space. It is contemplated, however, that the valve member may be cylindrical or conical, in which case modifications to the structure shown would be obvious to one skilled in the art.

The passageway 11 is defined by the inner diameter of first and second tubular members 18 and 19 which are arranged substantially coaxially of one another and concentrically within an outer sleeve 20 of the valve body 10 to provide an annular space 21 therebetween. More particularly, the seats 14 and 15 are formed on the oppositely facing ends of the tubular members 18 and 19, respectively. As shown in Fig. 1, the tubular member 18 is integral with the upper end 12 of the valve body and the sleeve 20 is welded thereto at 22 to close the upper end 21a of the space 21. As shown in Fig. 2, the lower end of the sleeve 20 is threadedly connected to a sub 24 which provides the end 13 of the valve body, and an O-ring 23 is disposed between the sleeve and sub.

The valve member is rotated between closed and fully opened positions by means of a cylindrical actuator or control frame 25 which is longitudinally reciprocable within the valve body concentrically outwardly of the passageway 11 therethrough. More particularly, the frame 25 is provided at its upper end with an annular piston 26 having inner and outer O-rings 27 and 28 sealably slidable within the space 21 between the tubular member 18 and sleeve 20 to define a variable capacity pressure chamber 29 between the upper pressure responsive surface 30 of the piston and the closed end 21a of the space.

A port 31 is provided through the valve body for communication with chamber 29. It is contemplated that the control fluid will be hydraulic so that pressure fluid admitted to the chamber through the port 31 will urge the frame 25 in a downward direction, while the exhaust of such control fluid, so as to relieve the pressure on surface 30, will permit the frame to be urged in an opposite, or upward, direction by means to be described. This latter movement is resisted by a coil spring 30a which extends between the piston 26 and closed end 21a of the chamber 29 to prevent the frame from being moved upwardly too quickly upon the exhaustion of control fluid therefrom. Also, of course, in the case of sub-surface valves, the force urging the frame 25 upwardly is resisted by the weight of the column of hydraulic fluid within the line 32.

Control fluid may be supplied from any suitable source exteriorly of the valve and selectively admitted to or exhausted from the pressure chamber 29 by either manual or automatic means. In the latter case, such control may be made responsive to a predetermined condition at the source of the fluid or another location, such as, for example, the flow line in which the valve is connected. Furthermore, in the case of a subsurface valve, the control fluid may be supplied through a small line 32 connected to the port 31 and extending upwardly to a source of such fluid at ground level. In the latter case, of course, production flow would be upwardly through the valve, as indicated by the arrows in Figs. 1 to 3.

It is contemplated, in accordance with the present invention, that the control frame 25 will be urged in a direction opposite to that toward which it is urged by control fluid within the chamber 29, and that the seat 15 will be urged into seated engagement with the valve member 16, by spring means arranged concentrically outwardly of the passageway 11 through the valve body and bearing against the control frame and tubular member 19. More particularly, it is contemplated that the spring means will be so designed as to exert sufficient force on the control frame for positively opening or closing the valve upon the relief of the pressure of fluid within the chamber 29, while at the same time exerting a lesser force on the seat 15 so as to permit easy rotating thereof. Thus, the valve is especially well-suited for low pressure installations, although in some installations wherein the control frame is urged upwardly by line fluid under high pressure, the spring means may be designed to exert correspondingly less force on the control frame or, in some cases, eliminated in entirety.

In its preferred form, this spring means includes a first coil spring 33 disposed between the inner end of sub 24 and an annular bearing part 34 on the second tubular member 19 and a second such spring 35 disposed between said bearing part and a thrust ring 36 on the frame 25. Obviously, the spring 35 acts upon the control frame 25 to urge it upwardly with a relatively large force. On the other hand, it is also obvious that the springs act oppositely to one another with respect to the second tubular member 19. More particularly, it is preferred that the force exerted due to the spring 35 at least approach that due to the spring 33 so that the force on seat 15 is small to permit rotation of the valve member with a minimum of friction. In fact, these springs may be so related and arranged that the valve member is engaged by the seat 15 with only sufficient force to exclude the passage of solids from the passageway into the space 21. As a result, the space beneath piston 26 may be vented by breathing across the valve seats, although a port 37a through the tubular member 18 may also be provided for this purpose.

The bearing part 34 on the second tubular member 19 is provided with an O-ring sealably slidable within the outer sleeve 20 so as to close the opposite end 21b of the space 21, and thereby seal off the control frame and spring 35 from solids within the fluid controlled by the valve. Of course, in installations in which the fluid is uncontaminated, the space 21 need not necessarily be closed by the tubular member 19 and its sliding seal 37. However, the construction of the valve illustrated in the drawings is preferred not only from the standpoint of providing positive movement of the control frame as well as protection thereof under a wide range of conditions, but also because it enables the above-described novel arrangement of forces on the control frame and valve seat. Furthermore, as can be seen from the drawings, the springs 33 and 35 are disposed on the side of valve member 16 opposite from the piston 26 so as to permit the control frame 25 to surround the valve member in closely spaced relation thereto.

The valve member 16 is connected to the control frame for rotation between closed and fully opened positions in response to reciprocation of the control frame longitudinally within the annular space 21. In the embodiment illustrated, the valve member is rotated to closed position (Fig. 3) upon the exhaust of control fluid from chamber 29 to move the frame into its uppermost position, and to fully opened position (Fig. 1) upon the admission of such fluid into the chamber to move the frame into its lowermost position. Obviously, however, this arrangement could be reversed so that, for example, the valve would open in response to exhausting of the pressure chamber.

The aforementioned connection comprises interengaging cam lugs on one and cam slots on the other of the control frame and opposite sides of the valve member. More particularly, the sides of the valve member 16 perpendicular to and concentric of its axis of rotation support disc-like cam lugs 38 for operative connection with substantially triangularly-shaped cam slots 39 in opposite sides of the control frame. The cam slots are provided with a recessed portion 40 at the apex thereof to receive one end of the cam lugs which serve as pivot points for the lugs which swing within the slot during rotation of the valve member.

The apex of each cam slot 39 describes an angle of approximately 90° which is bisected by a plane perpendicular to the axis of the opening 17 through the valve member. Thus, with the valve member urged into seated engagement with seat 14, the upward movement of the control frame and cam slots from the position of Fig. 1 to that of Fig. 2 raises the upper surface 39a of each cam slot above the cam lugs 38 and brings recess 40 into bearing on the pivotal ends of such lugs to swing them into a substantially horizontal position. Continued upward movement to the position of Fig. 3 completes closing of the valve member by bringing the recesses 40 into further bearing with the pivotal ends of the cam lugs to swing them downwardly into engagement with the lower surfaces 39b of the cam slots.

It will be seen from the foregoing that the connecting means tends to locate the valve member in either its opened or closed positions. However, in order to prevent overtravel of the valve member, the outer sleeve 20 is provided with an internal shoulder 41 for engagement with the piston 26 in the event of an excess of upward travel, and the control frame 25 is of such length that its lowermost edge 42 is adapted to engage bearing port 34 in the event of overtravel in a downward direction.

It will also be seen from Figs. 4 and 5 that in the interest of saving further space within the valve body, the sides of both the valve member 16 and the control frame 25 mounting the cam parts are flattened as at 43 and 44 inwardly of their outer and inner peripheries, respectively, and in substantial abutment with one another. More particularly, a cut-away portion 45 on each side of the frame has a flat plate 46 welded thereacross, and the cam lugs 38 are curved along their outer periphery so as to conform substantially with the outer diameter of the ball. (See Fig. 4.) Thus, the connecting means requires no more space than is required by the spherical portions of the valve member at opposite sides of the valve member and intermediate the opening 17.

Although the operation of this valve is apparent from the foregoing, it is noted by way of review that with control fluid exhausted from the pressure chamber 29, the valve member will be in the closed position of Fig. 3, wherein the seat 15 is urged into engagement with the valve member with only sufficient force to prevent the passage of solids into the space 21. Thus, upon admission of fluid into the chamber 29 so as to move the control frame downwardly, the valve member 16 is rotated to the fully opened position of Fig. 1. Due to the light force of seat 15 on the valve member, this rotation is accomplished with a minimum of frictional resistance. Of course, upon exhaustion of control fluid from the pressure chamber, the control frame will be moved positively upwardly to return the valve member to its closed position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a valve body connectable in a flow line, a tubular member having a passageway therethrough and arranged concentrically within the valve body to provide an annular space therebetween, means closing one end of said space, a seat across the tubular member, a valve member having an opening therethrough and seatable on the seat for opening and closing the passageway upon rotation about an axis transverse to the opening therethrough, a control frame movable longitudinally within the valve body concentrically outwardly of the passageway, means connecting the valve member to the control frame for rotation between opened and closed positions upon movement of the control frame in opposite longitudinal directions, and an annular piston on the control frame sealably slidable in said annular space to define a variable capacity pressure chamber between said piston and the closed end of the space, a port through the valve body communicating with the pressure chamber, and means for urging said control frame in a direction opposite to that toward which it is urged by pressure fluid within said chamber.

2. A valve of the character defined in claim 1, wherein said control frame urging means comprises spring means bearing upon said control frame concentrically outwardly of the passageway.

3. A valve of the character defined in claim 1, wherein said connecting means comprises cam lugs on one and cam slots on the other of said control frame and opposite sides of the valve member.

4. A valve, comprising a valve body connectable in a flow line, a first tubular member having a passageway therethrough and arranged concentrically within the valve body to provide an annular space therebetween, means closing one end of said space, a second tubular member sealably and guidably slidable longitudinally within the valve body and having a passageway therethrough in substantial axial alignment with the passageway through the first tubular member, oppositely facing seats across the first and second tubular members, a valve member having an opening therethrough and seatable at opposite sides upon said seats for opening and closing said passageways upon rotation about an axis transverse to the opening therethrough, a control frame disposed concentrically outwardly of said passageways for movement longitudinally of the valve body between said closed end of the annular space and said sliding seal, means connecting the valve member to the control frame for rotation between opened and closed positions upon movement of the control frame in opposite longitudinal directions, an annular piston on the control frame sealably slidable in said annular space to define a variable capacity pressure chamber between the piston and closed end of the space, a port through the valve body communicating with the pressure chamber, means for urging said control frame in a direction opposite to that toward which it is urged by pressure fluid within said chamber, and means for urging said second tubular member in a direction to seat upon said valve member.

5. A valve of the character defined in claim 4, wherein the urging means for said control frame is stronger than the urging means for the second tubular member so that the former urging means exerts a greater force on said control frame than the force that said latter urging means exerts on said second tubular member.

6. A valve of the character defined in claim 4, wherein said connecting means comprises cam lugs on one and cam slots on the other of said control frame and opposite sides of the valve member.

7. A valve, comprising a valve body connectable in a flow line, first and second tubular members arranged substantially coaxially of one another and concentrically within the valve body to provide a passageway therethrough and an annular space between said tubular members and said valve body, means closing one end of said space, said second tubular member being guidably movable longitudinally within the valve body and having a sliding seal therewith to close the other end of said space, oppositely facing valve seats across the first and second tubular members, a valve member having an opening therethrough and seatable at opposite sides upon said seats for opening and closing said pasageways upon rotation about an axis transverse to the opening therethrough, a control frame movable longitudinally of the valve body within said space, means connecting the valve body to the control frame for rotation between opened and closed positions upon movement of the control frame in opposite longitudinal directions, an annular piston on the control frame sealably slidable in said space to define a variable capacity pressure chamber between the piston and said first-mentioned closed end of the space, a port through the valve body communicating with the pressure chamber, and spring means urging said second tubular member into seated engagement with the valve member and said control frame in a direction opposite to that toward which it is urged by pressure fluid within said chamber.

8. A valve of the character defined in claim 7, wherein said spring means comprises a first longitudinally extending spring bearing upon said control frame, and a second longitudinally extending spring bearing upon said second tubular member, said springs being so related and arranged as to exert a greater force on the control frame than on the second tubular member.

9. A valve of the character defined in claim 8, including another spring extending longitudinally within the pressure chamber between the first-mentioned closed end of the space and said control frame.

10. A valve of the character defined in claim 7, wherein said valve member is ball-shaped, and said connecting means comprises cam lugs on one and cam slots on the other of said control frame and opposite sides of the ball valve member, each of said opposite sides of the valve member and the portions of the control frame supporting the cam parts thereon being flattened inwardly of their outer and inner peripheries, respectively.

11. A valve, comprising a valve body connectable in a flow line, tubular means having a passageway therethrough and arranged concentrically within the valve body to provide an annular space therebetween, means closing opposite ends of said space, spaced apart and oppositely facing seats across an intermediate portion of said tubular means, a valve member having an opening therethrough and seatable at opposite sides of said seats for opening and closing the passageway upon rotation about an axis transverse to the opening therethrough, a control frame movable in opposite directions longitudinally within said space and connected to said valve member for rotating it between opened and closed positions upon such movement, and means for moving the control frame in said opposite directions, wherein said moving means comprises an annular piston on the control frame sealably slidable in said annular space to define a variable capacity pressure chamber intermediate said piston and one closed end of the space, a port through the valve body communicating with said space, and means for urging said control frame in a direction opposite to that toward which is urged by pressure fluid within said chamber.

12. A valve of the character defined in claim 11, wherein said urging means includes spring means extending longitudinally within the valve body concentrically outwardly of the passageway and bearing upon said control frame.

13. A valve of the character defined in claim 11, wherein said connecting means comprises cam lugs on one and cam slots on the other of said control frame and opposite sides of said valve member.

14. A valve, comprising a valve body having a passageway therethrough and connectable in a flow line, a pair of spaced apart and oppositely facing spherical seats in surrounding relation to an intermediate portion of said passageway, a ball-type valve member having an opening therethrough and seatable between said seats for opening and closing said passageway upon rotation about an axis transverse to the opening therethrough, means enclosing a space in said valve body outwardly of the passageway therethrough, a control frame guidably movable in opposite directions within said space, cam lugs on one operatively engaged with cam slots on the other of said control frame and opposite sides of the ball-type valve member for rotating said valve member between opened and closed positions upon movement of the control frame in opposite longitudinal directions, a piston on said frame sealably slidable within said valve body to form a variable capacity pressure chamber in said space, a port through the valve body communicating with said chamber, and means for urging said control frame in a direction opposite to that toward which it is urged by pressure fluid within said chamber.

15. A valve of the character defined in claim 14, wherein the seats are provided on a pair of tubular members arranged substantially coaxially of one another to define the passageway through the valve body and concentrically within the valve body to define said space annularly of the passageway, said control frame being movable longitudinally within said space, and one of said tubular members being guidably movable axially of the other and yieldably urged into seating engagement with said valve member.

16. A valve, comprising a valve body connectable in a flow line, tubular means having a passageway therethrough and arranged concentrically within the valve body to provide an annular space therebetween, means closing one end of said space, seat means across the tubular means, a valve member having an opening therethrough and seatable on the seat means for opening and closing the passageway upon rotation about an axis transverse to the opening therethrough, means for urging said valve member into engagement with said seat means, a control frame movable longitudinally within the valve body concentrically outwardly of the passageway, means connecting the valve member to the control frame for rotation between opened and closed positions upon movement of the control frame in opposite longitudinal directions, an annular piston on the control frame sealably slidable in said annular space to define a variable capacity pressure chamber between said piston and closed end of the space, and a port through the valve body communicating with said chamber.

17. A valve of the character defined in claim 16, wherein said tubular means comprises a pair of tubular members substantially axially aligned with one another within the valve body, and said seat means comprises oppositely facing and spaced apart seats on the tubular members, one of said tubular members being guidably movable longitudinally of said valve body, and spring means bearing upon said one tubular member to urge said valve member into engagement with the seat on said other tubular member.

18. A valve, comprising a valve body connectable in a flow line and having a passageway therethrough, a pair of oppositely facing and spaced apart seats in surrounding relation to an intermediate portion of said passageway, a valve member having an opening therethrough said seatable between said seats for opening and closing said passageway upon the rotation about an axis transverse to the opening therethrough, a control frame movable in a path longitudinally within said valve body concentrically outwardly of the passageway therethrough, means connecting said valve member to said control frame for rotation between opened and closed positions upon movement of the control frame in opposite longitudinal directions, means for urging said control frame in said opposite directions, and means for maintaining said seats in seating engagement with said valve member with a lesser force than is exerted upon said control frame by said urging means.

References Cited in the file of this patent

UNITED STATES PATENTS

| 1,597,839 | String | Aug. 31, 1926 |
| 1,759,060 | Moore | May 20, 1930 |
| 2,613,908 | Palen | Oct. 14, 1952 |
| 2,708,563 | Backman | May 17, 1955 |
| 2,785,755 | En Dean | Mar. 19, 1957 |